UNITED STATES PATENT OFFICE.

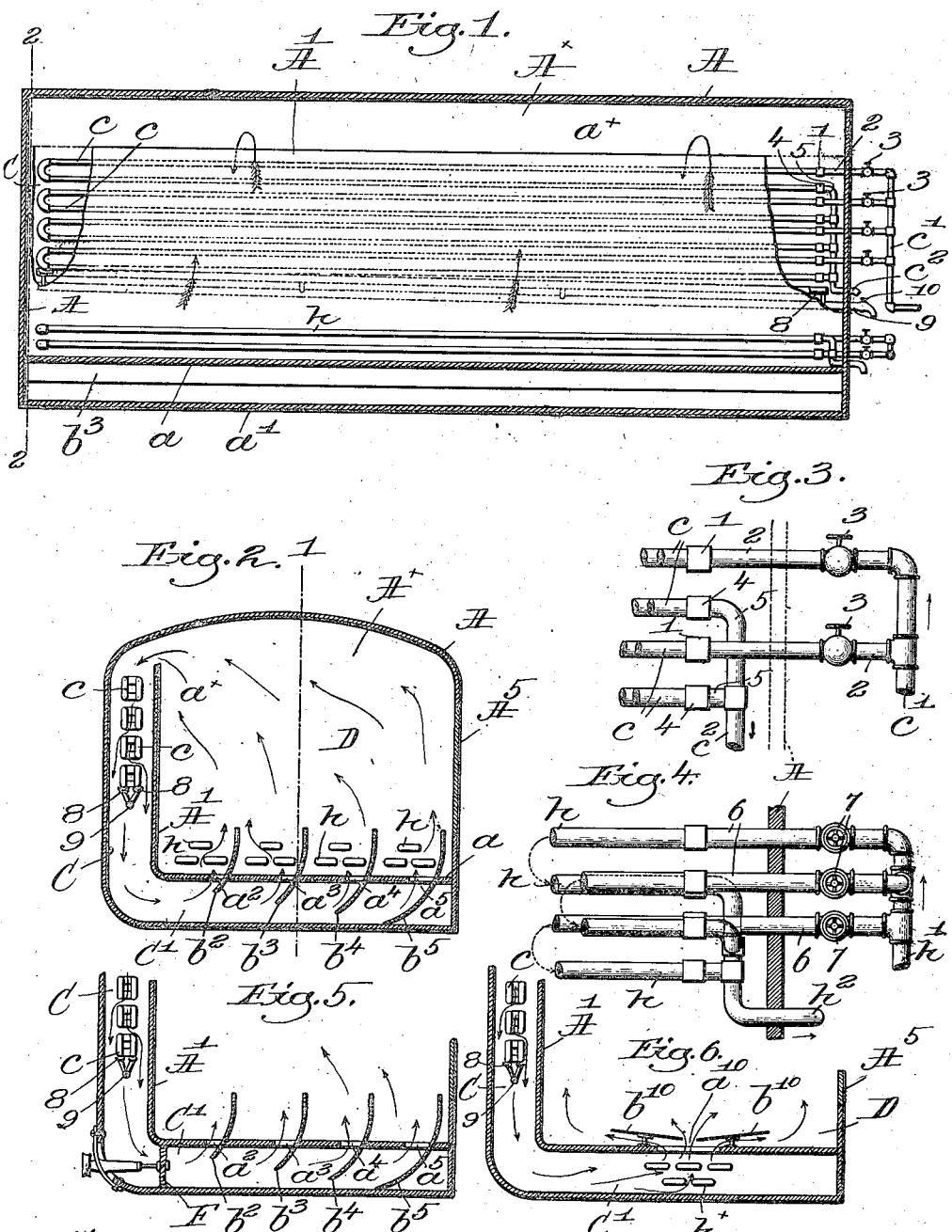

ELMER E. PERKINS, OF MELROSE, MASSACHUSETTS.

DRYING-KILN.

No. 810,974.     Specification of Letters Patent.     Patented Jan. 30, 1906.

Application filed December 3, 1904. Serial No. 235,290.

*To all whom it may concern:*

Be it known that I, ELMER E. PERKINS, a citizen of the United States, residing at Melrose, county of Middlesex, and State of Massachusetts, have invented an Improvement in Drying-Kilns, of which the following description, in connection with the accompanying drawings, is a specification, like characters on the drawings representing like parts.
This invention has for its object the production of a drying-kiln of very high efficiency and of extremely simple structure, particularly adapted for the rapid and thorough drying of material containing a large percentage of moisture—such as lumber, hides, leather, &c.—in a most economical manner. The subjection of such material to heated air extracts moisture therefrom at a rate dependent principally upon the dryness of the incoming air and the efficiency with which the moisture-laden air is withdrawn and fresh dry air supplied to take its place, and the less the amount of heat required the greater will be the efficiency of the mode of treatment.
In accordance with my present invention the material to be dried is placed in a closed chamber and heated dry air is introduced to the lower part thereof, the air rising and taking up moisture from the material. Such moisture-laden warm or hot air, as the case may be, passes from the upper part of the chamber to condensing means, which condenses the moisture in the air, (the condensate being removed by suitable means,) and the cooled dry air descends and is conducted into the lower part of the chamber, being subjected to the action of heating means to raise its temperature to the desired point. This heated dry air being light, rises in the chamber, absorbs moisture from the material to be dried, and again passes over to the condenser, as before.

The whole cycle of operations is conducted in a closed housing, the same air being alternately cooled and freed from moisture and reheated in its dry state to absorb moisture from the material in the drying-chamber, so that a continuous current of air is maintained therethrough.
It will be obvious that by using the air over and over no heat is lost except that due to the action of the condenser, and by regulating the relative action of the condensing and heating means the operation is varied as to rapidity and in accordance with the particular requirements of the material being treated.

The bottom of the chamber is provided with inlets increasing in area as they are farther from the main inlet for the cooled air, and curved guides are provided adjacent the said inlets to direct the air as it enters the chamber.

If desired, the rapidity of the self-induced air-current may be increased by mechanical means, as a fan, should the material to be dried call for such greater rapidity of action.

The various novel features of my invention will be fully described in the subjoined specification and particularly pointed out in the following claims.

Figure 1 is a longitudinal sectional view on the line 1 1, Fig. 2, of a drying-kiln embodying one form of my invention, the upright partition being broken out to show the condenser. Fig. 2 is a cross-section of the kiln on the line 2 2, Fig. 1, looking toward the right. Fig. 3 is an enlarged detail showing how the effective surface of the condenser may be varied. Fig. 4 is a plan view of convenient means for varying the action of the heating means. Fig. 5 is a partial sectional detail similar to Fig. 2, showing mechanical means for increasing the rapidity of the air-current; and Fig. 6 is a similar view showing a different arrangement of the heating means and the inlet to the drying-chamber.

Referring to Figs. 1 and 2, the kiln consists of a closed housing A, which may be a room or a building of any desired size and provided with one or more doors, as $A^5$, Fig. 2, divided by an upright partition $A'$, extending from end to end into a large drying-chamber D and an adjacent smaller compartment C, but of relatively large cross-sectional area, the top of the partition stopping short of the preferably curved roof $A^\times$ of the housing to present an outlet $a^\times$, extending the length of the drying-chamber.

The housing is made with a double bottom or floor $a$ $a'$, (see Fig. 2,) forming thereby a distribution or return compartment $C'$, which communicates with the lower portion of the compartment C.

The compartments C C' constitute a species of flue or conduit, communicating at its upper end with the chamber D at $a^\times$ and at its lower end with the lower portion of the said chamber by inlet-openings $a^2$, $a^3$, &c., (see Fig. 2,) in the bottom $a$. These openings I prefer to increase in area the farther away they are located from the junction of the compartments C C' in order that the flow of air into the chamber through said inlets may be more uniform throughout its width. I also prefer to provide air-guides $b^2$, $b^3$, &c., adjacent the inlets, the guides depending lower and lower as they recede from the partition A' to assist in the air distribution, the upper ends of the guides rising above the floor or bottom $a$ of the drying-chamber to prevent the formation of eddies or short-circuiting of the air-currents passing through the chamber. The connecting portion of the compartments C and C' are curved, as shown at $c$ in Fig. 2, to prevent the formation of dead-air spaces and to facilitate the flow of the air-current, and for a like reason the guides $b^2$, $b^3$, &c., are curved, as shown.

In the compartment C, I locate condensing means, shown as a double series of coils of piping $c$, through which any suitable cooling or refrigerating medium is circulated to reduce the temperature of the condenser to the desired point, the main inlet being shown at $c'$ and the outlet at $c^2$, Figs. 1 and 3.

Any suitable arrangement may be adopted for varying the effective condensing-surface, and herein I have shown the inlet ends of two adjacent coils connected by headers 1, communicating by pipes 2 with the main inlet $c'$ (see Fig. 3) and provided with suitable valves 3, while the return-bends of each pair of coils communicate by headers 4 and pipes 5 with the main outlet.

The valves are located outside the housing, and by shutting off one or more sets of the coils the condensing-surface is decreased as may be necessary, it being obvious that more condensing-surface is required when there is much moisture in the air than when the latter is less fully charged.

The moisture-laden heated air from the chamber D passes through the outlet $a^x$ into the compartment C and contacts with the condensing means, the contained moisture being immediately condensed and dripping from the coils $c$ into a suitable drip-trough, to be referred to, while the cooled dry air, being of greater specific gravity, descends in the compartment C and is directed thence by the compartment C' to the inlets $a^2$, $a^3$, &c., and into the drying-chamber D at its lower portion.

I provide heating means adjacent the bottom of the chamber and in close proximity to the inlets to heat this dry air and raise its temperature to the requisite degree to act properly upon the material to be dried. To this end heating-coils $h$ $h$ are shown in Figs. 1 and 2, located within the drying-chamber and just above the inlets $a^2$, $a^3$, &c., so that the incoming dry air as it passes around the coils is rapidly heated thereby and rises in the chamber to take up additional moisture from the material therein.

It will be manifest that the rising heated air acts as a suction to draw more air up into the chamber from the compartment C', while the descending cool air in the condensing-compartment C acts to suck in moist warm air at its upper end. Thus a continuous current of air is maintained in circulation through the chamber, passing out of it at its upper portion and into it at the bottom, the same air being used over and over, and alternately dried by the condenser and more or less impregnated with moisture by the material to be dried.

The heating-coils $h$ are preferably so constructed that the effective heating-surface may be varied, so that the apparatus may operate in the most economical manner, and the arrangement may be such as shown in detail in Fig. 4.

The main inlet is shown at $h'$, connected by pipes 6 with the inlet sides of the several coils $h$ and provided with controlling-valves 7, while the main return or exhaust is shown at $h^2$ and connected with the return sides of the coils. By means of the valves 7 any of the coils of each group can be shut off or cut out, thereby reducing the heating-surface as desired. For instance, in drying very green lumber at the beginning the full condenser action will be necessary, as the water in the lumber will be given up rapidly to the hot air at first, and the temperature of the dry air will be relatively high. As the drying progresses, however, the moisture in the lumber will be given off more slowly, so that some of the condenser can be cut out and also some of the heating-coils.

Drip-troughs 8 are shown as substantially U-shaped in cross-section, located beneath each vertical set of the condenser-coils $c$ and close thereto to interfere as little as possible with the free circulation of the air-current, the drip-troughs being inclined longitudinally to enable the condensate to flow readily to the lower end.

A discharge-pipe 9, connected with the troughs, passes through the wall of the housing A and may be provided with a valve 10, Fig. 1, so that the outflow will practically keep the pipe 9 full, preventing the escape of the air from the housing or the entrance thereto of outside air.

It will be seen that the width of the condensing-chamber is such as to afford ample passage for the air traversing the chamber to prevent any throttling or back pressure, either of which would result in holding back the moist air in the drying-chamber and cause it to become overheated and improperly act upon the material to be treated.

When the material to be dried is placed in the chamber and the openings thereto closed, the condensing and heating means are started, and a circulation of the contained air will be at once begun and maintained, the air being dried by condensation of its contained moisture as it is subjected to the action of the condenser, so that the air is dry when entering the lower portion of the drying-chamber.

Should it be desirable to increase the rapidity of the circulation, fans may be introduced in the conduit or circulation-compartment, as at F, Fig. 5, wherein the fan is shown at the lower end of the compartment C, to draw the air down through it and force it into compartment C' and thence to the chamber D.

In practice the fans would be arranged along the length of the housing, as many as necessary, according to the capacity of the chamber and the rapidity of current desired.

The fans may be driven in any suitable manner—electrically, by bolting, or otherwise.

In Fig. 6 I have shown the inlet-opening $a^{10}$ in the floor of the chamber D about midway between its front wall and the partition A', and the heating-coils $h^\times$ are grouped beneath the inlet in the compartment C'.

Above the inlet, vanes or guides $b^{10}$ are arranged to direct some of the incoming current of dry heated air toward the front and back of the drying-chamber to better distribute the current through the chamber.

Having fully described my invention, what I claim as new, and desire to secure by Letters Patent, is—

1. In a drying-kiln, a closed housing having an upright partition dividing it into a drying-chamber and an adjacent compartment of relatively large cross-sectional area communicating therewith at its upper end, a double bottom for the chamber, directly connected with the lower end of said compartment and having inlets into the chamber increasing in area as they are farther from the compartment, curved guides adjacent the inlets to direct the air as it enters the chamber, a condenser in the compartment, and heating means adjacent the inlets into the chamber, the alternate heating and cooling on opposite sides of the partition causing a continuous and free air-current through the chamber, the variations in the areas of the inlets and the curved guides distributing the incoming air uniformly throughout the chamber, and preventing the formation of eddies and dead-spaces.

2. In a drying-kiln, a closed housing having an upright partition dividing it into a drying-chamber and an adjacent compartment of relatively large cross-sectional area communicating therewith at its upper end, a double bottom for the chamber, directly connected with the lower end of said compartment and having inlets into the chamber increasing in area as they are farther from the compartment, curved guides adjacent the inlets and extending both above and below the plane in which the inlets are located, to direct the air as it enters the chamber, a condenser in the compartment, and heating means adjacent the inlets into the chamber, the alternate heating and cooling on opposite sides of the partition causing a continuous and free air-current through the chamber, the variations in the areas of the inlets and the curved guides distributing the incoming air uniformly throughout the chamber, and preventing the formation of eddies and dead-spaces.

3. In a drying-kiln, a closed housing having a transversely-curved roof and an upright partition dividing the housing into a drying-chamber and an adjacent condensing-compartment communicating therewith at its upper end, a double bottom for the chamber, having a direct and curved connection with the lower end of said compartment and having inlets into the chamber increasing in area as they are farther away from the compartment, curved guides adjacent the inlets to direct the air as it enters the chamber, and heating means adjacent said inlets, the alternate heating and cooling on opposite sides of the partition causing a continuous and free air-current through the chamber, the variations in the areas of the inlets and the curved guides distributing the incoming air uniformly throughout the chamber, and acting, with the curved roof and the curved connection between the compartment and the double bottom of the chamber, to prevent the formation of eddies and dead-spaces.

In testimony whereof I have signed my name to this specification in the presence of two subscribing witnesses.

ELMER E. PERKINS.

Witnesses:
    JOHN C. EDWARDS,
    MARGARET A. DUNN.